(No Model.)
I. J. POTTER.
CULTIVATOR.
No. 443,056. Patented Dec. 16, 1890.
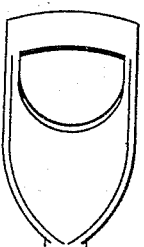
FIG 1
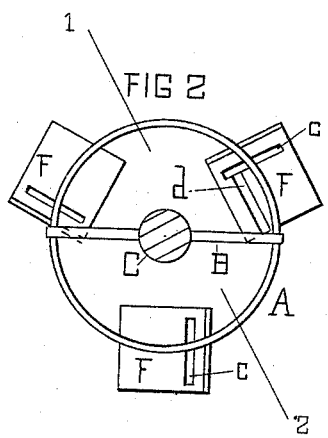
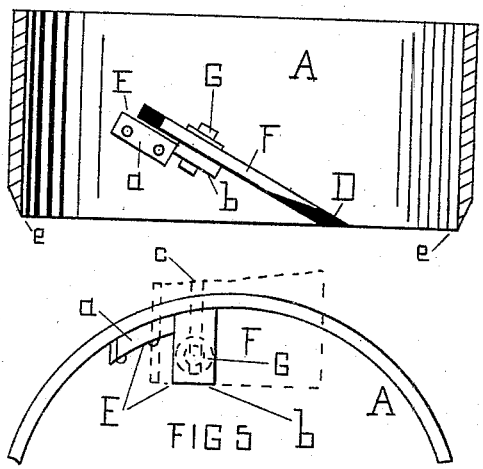
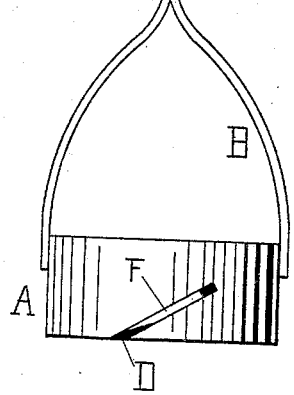
WITNESSES
INVENTOR
Isaac J. Potter
by Francis D. Pastorius
Solicitor

UNITED STATES PATENT OFFICE.

ISAAC J. POTTER, OF CAMDEN, NEW JERSEY, ASSIGNOR OF ONE-HALF TO JAMES G. STANTON, OF SAME PLACE.

CULTIVATOR.

SPECIFICATION forming part of Letters Patent No. 443,056, dated December 16, 1890.

Application filed June 30, 1890. Serial No. 357,230. (No model.)

*To all whom it may concern:*

Be it known that I, ISAAC J. POTTER, a citizen of the United States, and a resident of Camden, in the county of Camden and State of New Jersey, have invented a new and useful Hand-Cultivator, of which the following is a specification.

The invention is for cutting off suckers and sprouts of strawberry and other plants and tilling the soil around the same. From the end of a suitable handle is suspended a knife-edge cylinder, which has tilling knives or cutters so arranged in side openings as to be laterally and downwardly adjustable.

On reference to the accompanying sheet of drawings, making part of this specification, Figure 1 is an elevation. Fig. 2 is a top view of the cylinder and cutters, the handle being sectioned. Fig. 3 is a side elevation of the cylinder, the cutter-slot being shown by a heavy black line. Fig. 4 is an enlarged vertical section through the line 1 2, Fig. 2, the cutter-slot being shown by a heavy black line and the cutter lined in; and Fig. 5 is a plan view of Fig. 4, the cutter being in dotted lines.

Similar letters refer to similar parts in the several views.

A is a knife-edge cylinder suspended by a yoke B from the end of a handle C.

D are slots, of any required number and inclination, through the cylinder, each of which is provided with an angle-piece E, composed of the lengths $a\, b$, the former $a$ for bolting to the cylinder and the latter $b$ for projecting inwardly to afford a bed or bearing for a cutter F, fixed in place by a screw G, which takes through its transverse slot $c$, and thus permits of a lateral adjustment for regulating the scope of the tillage. For a downward regulation of the cutter across-slot $d$, with an additional holding-bolt, can be adopted.

The object the invention is designed to effect is cutting off the shoots and suckers that grow from strawberry and other plants and draw their nourishment from them. The cylinder A is placed over a plant, and on pressure being applied the knife-edge $e$ cuts off all its shoots, suckers, and other creepers that grow from the plant. As the edge of the cylinder takes into the ground the cutters F also enter a relative depth, and on the handle being turned the cylinder carries them around and they loosen up and till the soil.

I claim as my invention—

In a hand-cultivator, the combination of a carrying-handle C with a knife-edge cylinder A, provided with inclined slots D and adjustable cutters or cultivators F in said slots on inwardly-projecting beds or pieces E of the cylinder, for the purpose shown and described.

In testimony whereof I affix my signature in presence of two witnesses.

ISAAC J. POTTER.

Witnesses:
 FRANCIS D. PASTORIUS,
 WM. S. HOFFMAN.